United States Patent [19]

Burgdorf et al.

[11] 4,072,215
[45] Feb. 7, 1978

[54] SPOT TYPE DISC BRAKE FOR A PAIR OF INDEPENDENT YOKE BIASING SPRING ELEMENTS

[75] Inventors: Jochen Burgdorf, Offenbach; Dieter Eikenberg, Frankfurt-Rodelheim; Roberto Stoka, Sulzbach; Vlod Marianu, Frankfurt-Griesheim, all of Germany

[73] Assignee: ITT Industries, Incorporated, New York, N.Y.

[21] Appl. No.: 757,525

[22] Filed: Jan. 7, 1977

Related U.S. Application Data

[63] Continuation of Ser. No. 655,921, Feb. 6, 1976, abandoned.

[30] Foreign Application Priority Data

Aug. 29, 1977 Germany .......................... 2505879

[51] Int. Cl.² ............................................. F16D 55/18
[52] U.S. Cl. .................................. 188/72.4; 188/73.4; 188/73.5

[58] Field of Search ................ 188/73.3, 73.4, 73.5, 188/73.6, 72.4, 72.5, 370, 205 A

[56] References Cited

U.S. PATENT DOCUMENTS

| | | | |
|---|---|---|---|
| 3,612,224 | 10/1971 | Walther | 188/73.3 X |
| 3,658,160 | 4/1972 | Beller et al. | 188/73.4 |
| 3,913,709 | 10/1975 | Burgdorf et al. | 188/73.4 |

Primary Examiner—Trygve M. Blix
Assistant Examiner—Douglas C. Butler
Attorney, Agent, or Firm—John T. O'Halloran; Thomas M. Marshall

[57] ABSTRACT

A spot type disc brake having a non-rotating brake carrier to receive the brake disc with brake shoes disposed on both sides of the brake disc. The yoke or frame which embraces the disc is moveably guided in the brake carrier and is held therein by a pair of biasing springs. The biasing springs consist of two identical elements which, independent of one another, are secured to and supported on the brake carrier.

2 Claims, 5 Drawing Figures

SPOT TYPE DISC BRAKE FOR A PAIR OF INDEPENDENT YOKE BIASING SPRING ELEMENTS

This is a continuation of application Ser. No. 655,921, filed Feb. 6, 1976, and now abandoned.

FIELD OF THE INVENTION

Spot type disc brakes for automotive vehicles.

DESCRIPTION OF THE PRIOR ART

The spot type disc brake illustrated and described herein is of the general type shown in U.S. Pat. No. 3,913,709. It has a non-rotating brake carrier which receives the brake torque, with the brake carrier being fixed in relation to the disc brake with brake shoes or pads arranged on either side of the brake disc. A moveable yoke or frame protrudes over and embraces the brake disc and is slidably guided by guide element portions of the brake carrier to permit its movement in a plane parallel to the axis of the brake disc. A resilient means holds the yoke or frame in the guiding elements of the brake carrier so that there is no clearance as between the two. The yoke or frame transmits the operating force of an actuating device arrangement on one side of the brake disc so that the actuating device, which acts directly on one of the brake shoes, is transmitted to the brake shoe arranged on the other side of the brake disc. The yoke or frame is supported on the carrier by at least three guide regions. The resilient biasing means is arranged between the brake carrier and the yoke or frame so as to bias the yoke or frame against the carrier at a point or position which is spaced from the guide regions.

SUMMARY OF THE INVENTION

It is the object of this invention to improve upon a spot type disc brake according to the aforesaid U.S. patent in regard to safety of operation. This object is achieved by providing a resilient spring means consisting of two identical acting springs which, independent of each other, are secured to and supported on the brake carrier. In the event that one of the spring portions breaks, the intact spring portion remains and is effective to bias the frame or yoke against the brake carrier. Thus, even though one of the resilient elements is broken the other remains operable to insure that the yoke or frame is properly guided.

In the preferred embodiment, the resilient means of this invention consists of two spring elements separated from one another. This results in a simplification of the manufacture of the spring elements and their being fitted in the brake carrier. The brake carrier is provided with retaining apertures into which the fastening ends of the two separate spring elements are retained so that the fastening ends extend in a direction away from the brake disc. Each of the springs has a middle section which is carried by the brake carrier and further has free ends which project over the brake carrier away from the brake disc and which abut against the frame or yoke. Advantageously, the spring elements are designed so that following the insertion of their retaining ends into the apertures on the brake carrier they are moveable from a mounting position into an operating position so that their middle sections embrace from behind projections on the brake carrier so that they are in positive engagement with retaining apertures of the brake carrier and cannot accidentally move out of the apertures or fall off of the brake carrier.

In a further preferred embodiment, each of the spring elements of the spot type disc brake of this invention essentially have a U-shaped and an L-shaped portion, with the L-shaped portion being substantially perpendicular to the plane of the U-shaped member. This design makes the fitting of the spring elements to the brake carrier a simple matter in production. For those spot type disc brakes where the cylinder housing of a hydraulic actuating device is fitted to a slidable yoke or frame, it is advantageous if the free ends of the spring members abut against the cylinder housing in a symmetrical relationship to the longitudinal axis to the cylinder housing in a spaced relationship with respect to each other. In this construction, the hydraulic port which connects the brake cylinder is preferably arranged radially relative to the disc axis which permits a favorable utilization of the relatively small space available in the wheel dish. To center the yoke in the guiding portions of the carrier, it is preferred to provide for the abutment for each of the spring members against surfaces on either side of the cylinder housing with an abutting surface being aligned radially with respect to the brake disc.

BRIEF DESCRIPTION OF THE DRAWINGS

One embodiment of the invention will be described in detail below by reference to the accompanying drawings, in which.

DESCRIPTION OF THE PREFERRED EMBODIMENTS

Figure 1:
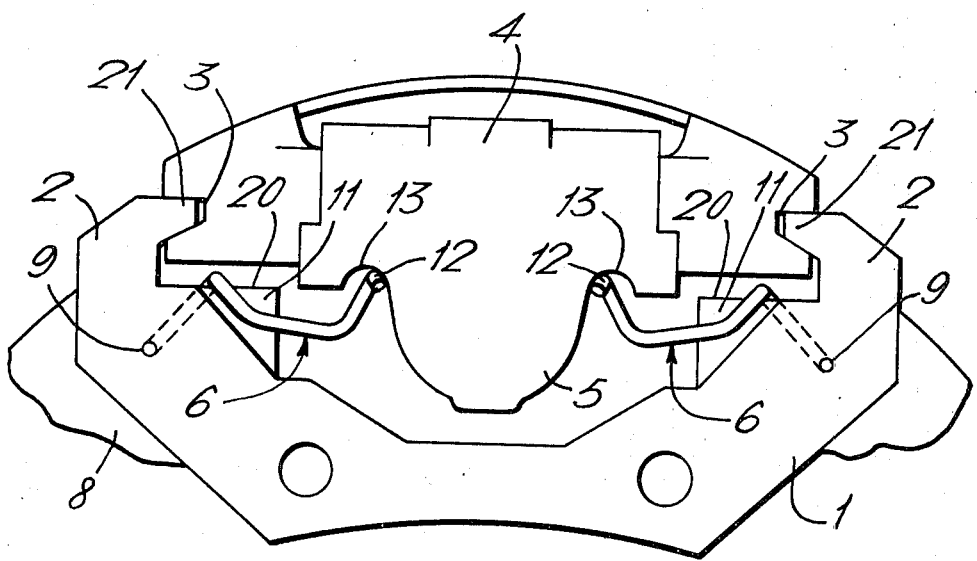
FIG. 1 is a rear elevation view of a support type disc brake of this invention.
Figure 2:
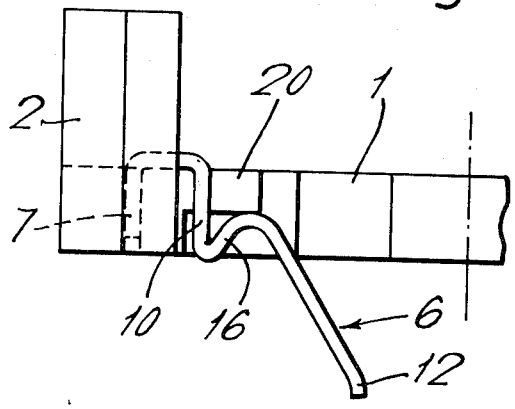
FIG. 2 is a partial top view of the brake carrier illustrated in the embodiment of FIG. 1.

The support type disc brake illustrated in FIGS. 1 and 2 has a brake carrier 1 consisting of a plate which has the approximate shape of tongs with the tong arms 2 engaging axial grooves 3 provided along either side of the yoke 4 so that the yoke 4 is slidably guided on the brake carrier 1 in an axial relationship to the brake disc axis. A cylinder housing 5 of a hydraulic actuating device is solidly attached to and mounted on the yoke 4.

Figure 3:
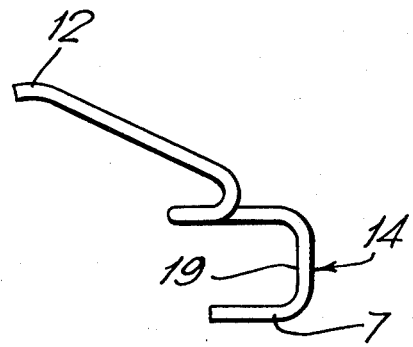
FIG. 3 is an elevation view of one of the spring elements of this invention.
Figure 5:
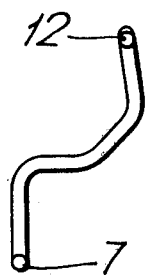
FIG. 5 is a side view of the spring element illustrated in FIG. 3.

Two symmetrical spring elements 6, separated from each other, also illustrated in FIGS. 3 and 5, extend with their fastening ends 7 positioned in retaining apertures 9 in the brake carrier 1 in a direction away from the brake disc. The retaining apertures 9 have bores which are disposed in a parallel relationship to the brake disc axis. Each of the spring elements 6 has a middle section 10 which embraces and is carried on the brake carrier 1 at projections 11 formed on the brake carrier 1. The free ends 12 of each of the spring elements abut against supporting surfaces 13 formed as part of the cylinder housing 5. The supporting surface 13 and hence the free ends of spring elements 6 are symmetrical to the longitudinal axis of the brake carrier 1.

Figure 4:
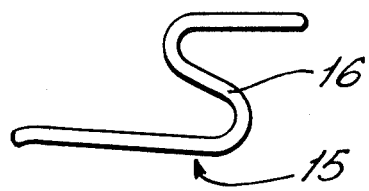
FIG. 4 is a top view of the spring element illustrated in FIG. 3.

Referring to FIGS. 3, 4 and 5 and the details illustrated in FIG. 2, it will be seen that the spring elements 6 have a U-shaped portion 14 and an L-shaped portion 15, with the L-shaped portion 15 being approximately perpendicular to the plane of U-shaped portion 14, there being a short arm 16 which connects the arm of U-shaped portion 14 which is formed by the middle section 10.

During assembly of the support type disc brake of this invention, the spring elements 6 are mounted to the brake carrier 1 by inserting their fastening ends 7 of the U-shaped members 14, into the respective retaining apertures 9 in the direction away from the brake disc until the apex 19 of U-shaped member 14 comes into abutment with the brake carrier 1. Thereafter, the spring elements 6 are moved into the open area of the tong arms 2 by swinging them so that the middle section 10 embraces the projection 11 and so that the short arm 16 of L-shaped member 15 comes into abutment with the side projections 11 at a position remote from the brake disc. During this process, the middle section 10 of the spring element 6 comes into abutment with a supporting surface 20 on the brake carrier 1. Since the above referred to portions of spring elements 6 fit as they do to the carrier 1, by embracing both the brake carrier and the abutment of the spring element 6 against the projections 11, the spring elements 6 cannot move out of the retaining apertures 9 when the support type disc brake of this invention is assembled. The ends 21 of the tong arms 2 are designed to guide the yoke 4 by means of grooves 3 formed in yoke 4. The free ends 12 of spring elements 6 come into abutment with the supporting surfaces 13 on the cylinder housing 5 thus biasing the yoke 4 against the brake carrier 1 which engages with its ends 21 of its tong arms 2 the grooves 3 of yoke 4.

Since each of the spring elements 6 are independent of each other, the breaking of one of the two spring elements 6 does not effect the functioning of the other spring elements 6 so that the yoke 4 will remain in its proper biased position relative to brake carrier 1.

What is claimed is:

1. A spot type disc brake for automotive vehicles including a non-rotating brake carrier to receive brake torque, said brake carrier being fixed in relation to a brake disc, a yoke member positioned to protrude over and embrace said brake disc and slidably guided by said brake carrier in the direction of the brake disc axis including an actuating device arranged on one side of said brake disc, a pair of biasing resilient spring elements, each of said biasing spring elements having a fastening end rotatably carried in a retaining aperture formed in said brake carrier on said one side of said disc, each of said biasing spring elements being positioned wholly on said one side of said disc, said fastening end of each of said spring elements having an insertion portion for positioning in said retaining aperature which extends substantially parallel to the axis of said disc which is of sufficient length to engage said retaining aperture and extends towards said disc, then is bent so as to extend towards said axis, then is bent so as to extend away from said disc forming a U-shaped middle section adapted to embrace a portion of said brake carrier and has a free end portion projecting away from said brake disc arranged to resiliently contact and bias said actuating device for holding said yoke in relation to said carrier without clearance.

2. The spot type disc brake as set forth in claim 1 wherein said biasing spring elements comprise two separate spring members positioned apart from each other.

* * * * *